United States Patent [19]

Becker et al.

[11] Patent Number: 4,718,575

[45] Date of Patent: Jan. 12, 1988

[54] APPARATUS FOR ASCERTAINING THE LEVEL OF FLOWABLE MATERIAL IN DUST SEPARATORS AND THE LIKE

[75] Inventors: Rolf Becker, Engelskirchen; Werner Frank, Bergisch Gladbach, both of Fed. Rep. of Germany

[73] Assignee: Walther & CIE Aktiengesellschaft, Cologne, Fed. Rep. of Germany

[21] Appl. No.: 868,330

[22] Filed: May 29, 1986

[30] Foreign Application Priority Data

Aug. 19, 1985 [ZA] South Africa ............... 85/6265

[51] Int. Cl.$^4$ ............... B67D 5/08; H01H 35/00; H01H 35/40
[52] U.S. Cl. ............... 222/53; 222/64; 222/517; 200/61.21; 200/83 A; 414/323
[58] Field of Search ............... 222/517, 53, 56, 64; 340/614, 617, 612; 55/215; 406/23–25, 32, 33; 73/303; 200/83 A, 61.21, 82 C, 81.9 R; 141/198; 414/206, 323

[56] References Cited

U.S. PATENT DOCUMENTS

| | | | |
|---|---|---|---|
| 1,829,807 | 11/1931 | McMurrin | 200/83 A X |
| 2,640,977 | 6/1953 | Parisi | 200/61.21 X |
| 2,719,889 | 10/1955 | Miller | 200/83 A X |
| 3,734,313 | 5/1973 | Gauthier et al. | 414/296 |
| 3,935,970 | 2/1976 | Spaw | 222/64 X |
| 4,118,075 | 10/1978 | Lubbehusen | 406/33 |
| 4,201,315 | 5/1980 | Chuss et al. | 340/617 X |
| 4,522,634 | 6/1985 | Frank | 55/2 |
| 4,527,714 | 7/1985 | Bowman | 222/64 X |

FOREIGN PATENT DOCUMENTS

| | | | |
|---|---|---|---|
| 1265820 | 12/1957 | Fed. Rep. of Germany | 200/83 A |
| 0007829 | 1/1981 | Japan | 406/23 |

Primary Examiner—Joseph J. Rolla
Assistant Examiner—Gregory L. Huson
Attorney, Agent, or Firm—Peter K. Kontler

[57] ABSTRACT

The hoppers of several dust precipitators are connected to a common readily accessible monitoring station by discrete conduits each of which has a first open end at a preselected level in the respective hopper, a second open end at the monitoring station and an intermediate portion extending above the corresponding preselected level. Suction which normally prevails in the hoppers tends to maintain closed pivotable flaps for the second open ends of the conduits. If the dust in a hopper accumulates to or rises above the respective preselected level, the corresponding flap is opened by a counterweight and such movement of the flap entails the generation of a signal which is used to evacuate dust from the corresponding hopper and/or to actuate an alarm for the convenience and attention of the persons in charge.

13 Claims, 2 Drawing Figures

APPARATUS FOR ASCERTAINING THE LEVEL OF FLOWABLE MATERIAL IN DUST SEPARATORS AND THE LIKE

BACKGROUND OF THE INVENTION

The present invention relates to apparatus for ascertaining and monitoring the accumulations of flowable solid material in containers for flowable material, particularly in the hoppers of dust separators in large chemical or other plants.

Dust separators (such as electrostatic precipitators, bag filters, bag houses and the like) are used in flue gas systems of power stations and are normally operated at a reduced pressure under the action of an induced draft fan serving to draw flue gases and/or other gases which are to be relieved of dust and/or other flowable solid material through one or more dust separators and into a stack or another exhaust system. Solid material which is separated from flue gases normally descends into one or more hoppers or analogous containers preferably having conical, funnel-shaped or similar bases leading to discharge openings for evacuation of accumulated solid material. It happens again and again, particularly as a result of bridging, compacting, agglomeration or a combination of such undesirable phenomena, that the solid material blocks the discharge opening or openings of one or more hoppers and begins to rise. While it is customary to tolerate certain accumulations of dust and other flowable solid materials, corrective measures must be undertaken when the accumulated solid material piles up to a predetermined level. This is the reason for the provision of apparatus which monitor the level of the accumulated solid material in the hoppers and are designed to generate warning signals as soon as the accumulated material in a hopper reaches a predetermined level.

In a large power station, the hoppers of dust precipitators are often installed at a considerable distance (e.g., many meters) above the ground level, and the predetermined level to which the accumulate solid material is permitted to rise in a hopper before the monitoring apparatus generates a signal is well above (normally many meters above) the level of the discharge openings at the bottom ends of the hoppers. Certain presently known level sensing apparatus employ electrically energized tuning forks which are installed in the hoppers at predetermined levels above the discharge openings and cease to vibrate as soon as they become embedded in a pile of accumulated solid material. This gives rise to the generation of a signal by suitable electronic monitoring means. A drawback of such level sensing apparatus is that a tuning fork is prone to malfunction as a result of corrosion and/or accumulation of dust thereon and, consequently, it must be accessible for inspection, cleaning or replacement. It is further known to employ other electronic level sensing apparatus, e.g., apparatus employing capacitance-responsive sensors which are mounted in the hoppers and, consequently, are prone to malfunction on the aforediscussed grounds and/or for other reasons. It is also known to employ pressure-responsive sensors which are installed in the walls of the hoppers above the predetermined level of permissible accumulation of solid material and comprise open-ended pipes extending downwardly into the respective hoppers to the predetermined level. Such pressure-sensitive sensors also require frequent cleaning and other forms of maintenance. This is possible only by affording access to the level sensing apparatus, e.g., by providing expensive and often dangerous staircases, service platforms and/or other facilities in order to enable the person in charge to reach and service the apparatus. The just outlined problems have existed for many decades and the presently known solutions are far from ideal or even halfway satisfactory.

OBJECTS AND SUMMARY OF THE INVENTION

An object of the invention is to provide a novel and improved apparatus for monitoring the accumulations of flowable solid materials in one or more containers for flowable solid material, particularly in the hopper or hoppers of one or more dust separators in large power plants and analogous establishments, in such a way that the inspection, servicing and/or replacement of the components of the apparatus is simpler, safer and less expensive than in accordance with heretofore known proposals.

Another object of the invention is to provide a monitoring apparatus which can be installed in existing dust precipitators and analogous systems for accumulation of flowable solid materials as a superior substitute for heretofore known apparatus.

A further object of the invention is to provide an apparatus whose operation is tailored to the operation of conventional dust precipitators and like systems so that the apparatus can embody, or can be operated by, certain components of existing dust precipitators.

An additional object of the invention is to provide an apparatus which is readily accessible for inspection, repair and/or replacement irrespective of the level of the container or containers for accumulated flowable solid material and whose servicing does not necessitate the erection of platforms, staircases and/or other specially designed structures which contribute to the cost, space requirements and potential dangerousness of conventional plants wherein one or more flowable solid materials must be segregated from one or more gaseous carrier media.

Still another object of the invention is to provide a novel and improved method of ascertaining and controlling the accumulations of flowable solid materials in the hoppers of dust precipitators in power plants and the like.

A further object of the invention is to provide an apparatus which can be used for simultaneous monitoring of accumulations of flowable solid material in a battery of two or more identical or differently configurated and/or dimensioned hoppers or other types of containers.

One feature of the present invention resides in the provision of an apparatus for monitoring the accumulations of flowable solid material in a container for flowable material, particularly in the hopper of an electrostatic or otherwise operated dust separator. The apparatus comprises a conduit having a first opening disposed in the container at a predetermined level, a readily accessible second opening outside of the container, and an intermediate portion disposed between the two openings and preferably extending at least in part above the predetermined level. The apparatus further comprises means for establishing a pressure differential between the interior of the container and the atmosphere around the second opening so that flue gas, air or another gaseous fluid tends to flow from one of the openings toward the other opening and the pressure differential undergoes a change in response to at least partial obstruction of the first opening as a result of an accumulation of flowable material in the container at least to the predetermined level, and means for generating signals in response to a predetermined change of the pressure differential. The means for establishing a pressure differential can comprise a stack, a fan and/or other suitable means for drawing gaseous fluid from the container so that the fluid tends to flow from the second opening toward the first opening. The signal generating means is then preferably responsive to a rise of fluid pressure in the conduit. The predetermined level is normally above the ground level and, if convenient and economical, the second opening can be located and/or made accessible at or from the ground level.

The signal generating means can comprise a valving element (e.g., in the form of a pivotably mounted circular disc-shaped flap) which is movable to and from an operative position in which it at least partially seals the second opening under the pressure of atmospheric air around the second opening, and a weight, one or more springs and/or other suitable means for biasing the valving element away from its operative position so that the valving element is free to leave such position when the pressure differential between the interior of the conduit and the atmosphere around the second opening is reduced as a result of at least partial obstruction of the first opening by the accumulation of flowable solid material in the container. The signal generating means can further comprise means (e.g., an electric switch) for transmitting a detectable (e.g., visible or audible) signal in response to movement of the valving element from the operative position.

The apparatus can further comprise means for expelling flowable solid material (and, if necessary, accumulations of liquid droplets) from the conduit, either at regular intervals or when the need arises. The expelling means can comprise a source of compressed gaseous fluid (normally air) and means for selectively admitting compressed fluid from the source into the conduit. To this end, the intermediate portion of the conduit can comprise a branch which is connected with the source of compressed fluid and the admitting means then comprises a suitable valve (e.g., a shutoff valve) in the branch. A second shutoff valve can be provided in the conduit between the branch and the second opening to prevent escape of admitted compressed fluid by way of the second opening.

The apparatus can be designed for simultaneous monitoring of accumulations of flowable solid material (e.g., fly ash and/or dust) in at least one additional container for flowable solid material. Such apparatus further comprises an additional conduit having a first opening disposed in the additional container at a preselected level, a readily accessible second opening outside of the additional container, and an intermediate portion disposed between the two openings of the additional conduit and extending at least in part above the preselected level. Such apparatus further comprises means for establishing a pressure differential between the interior of the second container and the atmosphere at the second opening of the additional conduit so that a gaseous fluid tends to flow from one of the openings toward the other opening of the additional conduit and the pressure differential undergoes a change in response to at least partial obstruction (such as clogging) of the first opening of the additional conduit as a result of accumulation of flowable solid material in the additional container at least to the preselected level, and means for generating signals in response to a predetermined change of pressure differential between the interior of the additional container and the area around the second opening of the additional conduit. The preselected level in the additional container can match or approximate the predetermined level in the first mentioned container. The second openings of the two conduits and the two signal generating means are preferably closely or immediately adjacent to each other.

Another feature of the invention resides in the provision of a method of ascertaining the accumulations of flowable solid material (such as dust and/or fly ash) in a container for flowable material, particularly in the hopper of an electrostatically or otherwise operated dust precipitator. The method comprises the steps of establishing a path for the flow of a gaseous fluid between the interior and the exterior of the container, setting up a pressure differential between a first portion of the path at a predetermined level in the container and a readily accessible second portion of the path outside of the container along an intermediate portion of the path extending between the first and second portions and at least in part above the predetermined level so that the pressure differential undergoes a change in response to partial or complete obstruction of the flow of fluid in the first portion of the path as a result of a pileup of flowable solid material in the container to or above the predetermined level, monitoring the pressure differential in the region of the second portion of the path, and generating a signal in response to a predetermined change of the pressure differential.

The method can further comprise the step of evacuating flowable solid material from the container in response to generation of the signal and/or of displaying the signal.

The method can be employed for simultaneous ascertainment of accumulations of flowable solid material in at least one additional container for flowable material, particularly in the hopper of an additional dust precipitator. Such method further comprises the steps of establishing an additional path for the flow of a gaseous fluid between the interior and the exterior of the additional container, setting up a pressure differential between a first portion of the additional path at a preselected level in the additional container and a readily accessible second portion of the additional path outside of the additional container along an intermediate portion of the additional path extending between the first and second portions of the additional path and at least in part above the preselected level whereby the pressure differential between the first and second portions of the additional path undergoes a change in response to obstruction (e.g., total blocking) of the flow of fluid in the first portion of the additional path as a result of accumulation of flowable solid material in the additional container at least to the preselected level, monitoring the pressure differential in the region of the second portion of the additional path, and generating a signal in response to a predetermined change of pressure differential between the first and second portions of the additional path. The preselected level can (but need not) match or approximate the predetermined level. Furthermore, the second portions of the two paths can be disposed at the same level, e.g., at or close to the ground level in a large coal burning power plant or the like.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
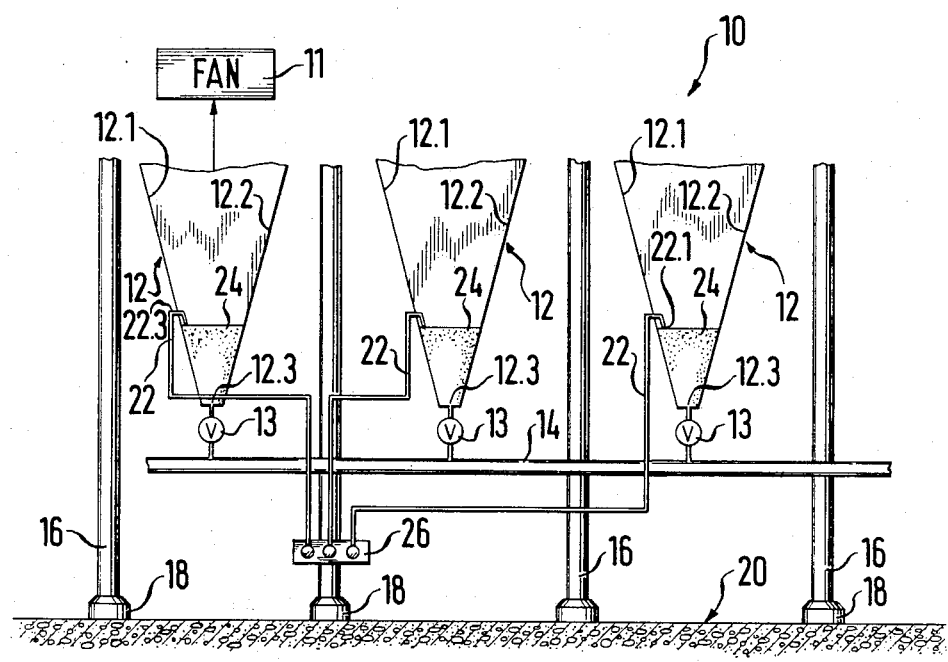
FIG. 1 is a fragmentary diagrammatic elevational view of a battery of three adjoining dust separators whose hoppers are equipped with monitoring apparatus embodying the invention.

FIG. 1 shows a portion of a power plant 10 employing a battery of three identical or similar electrostatic dust precipitators each of which comrpises an upright container 12 in the form of a hopper. Dust precipitators adapted to be equipped with the improved monitoring apparatus can be of the type frequently used in large coal-fired power stations and serving to segregate dust and/or fly ash from flue gases and other gaseous carrier media. The separated flowable solid material accumulates in the hoppers 12 each of which forms the lower part of the respective electrostatic precipitator and each of which comprises downwardly converging sidewalls 12.1 and 12.2 terminating at a discharge opening 12.3 which is controlled by a shutoff valve 13 (e.g., a gate valve) and is disposed above a dust disposal system employing one or more chain conveyors 14, chain grates, air slides or the like to evacuate solid material from the dust precipitators. The inclination of the sidewalls 12.1 and 12.2 suffices to ensure automatic flow of precipitated dust and other solid materials toward the respective discharge openings 12.3. The hoppers 12 are installed in a frame including columns 16 mounted on foundations 18 at the ground level 20.

As a rule (particularly due to the sheer size of the power plant 10 as well as because of certain other considerations), the hoppers 12 are located well above the ground level 20, often as high as 15 meters above the ground. Moreover, the predetermined level (shown at 24) to which the solid material can accumulate in a hopper 12 is often several meters above the level of the respective discharge opening 12.3. Thus, in order to afford frequent access to the hoppers 12 for the purpose of inspecting conventional level monitoring apparatus (e.g., apparatus employing tuning forks), it would be necessary to erect platforms and staircases and to service the apparatus twenty or more meters above the ground level 20.

The monitoring apparatus of the present invention comprises a discrete conduit 22 for each of the hoppers 12. Each conduit 22 has a first opening 22.1 at the level 24 in the respective hopper 12, a second opening 22.2 at the level of a monitoring station 26 at or close to the ground level 20 so that the second openings 22.2 can be reached by a person standing on the ground, and an intermediate portion a part at least of which (see 22.3) extends above the level 24. The first openings 22.1 are disposed in the respective hoppers 12, and the second openings 22.2 are located outside of the hoppers and are readily accessible, either at the ground level 20 or, if desired or more practical, at another level which is selected for compelling reasons other than the mere servicing and/or inspection of parts at the monitoring station 26.

The monitoring station 26 is defined by a box-shaped receptacle 48 (see FIG. 2) which has a foraminous (e.g., perforated) bottom wall or base 48.2 and a movable (e.g., pivotable) front wall or door 48.1 consisting of or comprising one or more panels made of glass or other suitable light-transmitting material. The receptacle 48 confines three signal generating units 28 (only one shown in detail in FIG. 2), one for each of the hoppers 12.

FIG. 1 shows a fan 11 which serves as a means for drawing flue gases, air and/or other gaseous fluids (hereinafter air) from the leftmost hopper 12. This fan, or one or more additional fans, can be used to evacuate air from the other two hoppers 12 so that, as a rule, the pressure in each hopper above the level of accumulated flowable solid material is below atmospheric pressure. Thus, the fan or fans 11 constitute a means for establishing a pressure differential between the interior of the hoppers 12 in the regions of the openings 22.1 and the interior of the receptacle 48 in the region of the openings 22.2, i.e., between the interior of a hopper 12 and the atmosphere around the corresponding signal generating unit 28 at the monitoring station 26. Consequently, a stream of air tends to flow from each opening 22.2 toward the respective opening 22.1, and such tendency of air to flow from the receptacle 48 into the hoppers 12 is utilized to operate the signal generating units 28 whenever the accumulation of solid material in a particular hopper exceeds the permissible value, namely when the accumulated flowable solid material reaches the respective predetermined level 24 and tends to obstruct (or actually obstructs) the flow of air between the interior of the hopper 12 and the interior of the intermediate portion of the respective conduit 22. This causes the pressure in the conduit 22 to rise because the influence of the fan 11 is weakened by the material which obstructs the opening 22.1 so that the pressure differential between the interior of the conduit 22 and the interior of the receptacle 48 changes (the pressure differential is reduced).

Figure 2:
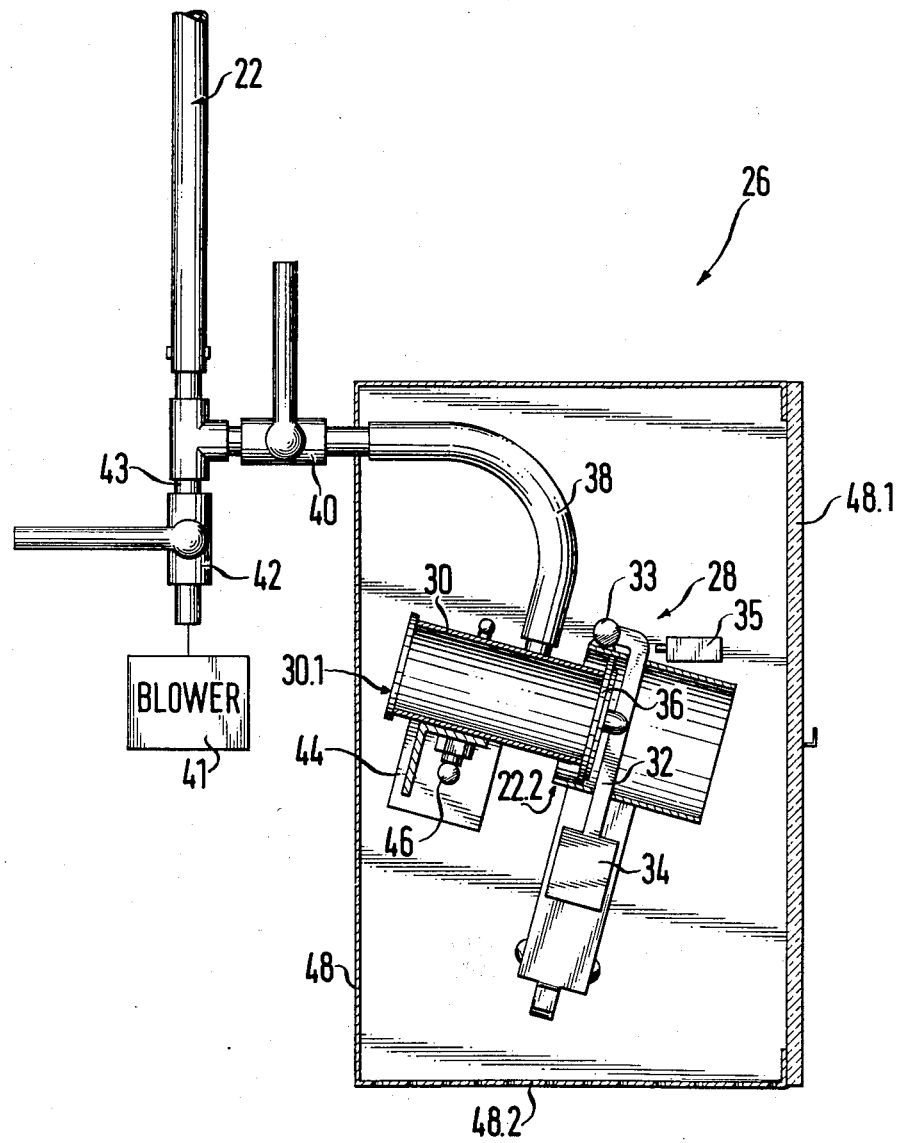
FIG. 2 is an enlarged partly elevational and partly sectional view of means for generating signals in response to an excessive pileup of dust in one of the hoppers.

The second opening 22.2 of each conduit 22 is defined by a discrete cylindrical vessel 30 which is mounted on a bracket 44 in the receptacle 48, preferably for pivotal movement about a horizontal axis defined by a pin 46 which connects the bracket 44 to a wall of the receptacle 48. That part of the conduit 22 which communicates with the vessel 30 constitutes a flexible hose 38 which allows for at least some pivotability of the vessel 30 about the axis of the respective pivot pin 46. The left-hand end 30.1 of the vessel 30 which is shown in FIG. 2 is closed, and the right-hand end of this vessel defines the second opening 22.2 of the respective conduit 22. The second end 22.2 is normally closed and is then at least substantially sealed by a flap-like valving element 36 which is attached to the intermediate portion of a supporting arm 32 pivoted to the receptacle 48, as at 33, for angular movement about a horizontal axis. The inclination of the vessel 30 is selected in such a way that the valving element 36 (hereinafter called flap) tends to leave the illustrated operative position in order to permit atmospheric air to enter the vessel 30. Such tendency of the flap 36 to leave its operative position is assisted by a counterweight 34 which biases the supporting arm 32 in a counterclockwise direction. It is clear that the weight 34 can be replaced by or can be used jointly with one or more springs or any other suitable means for biasing the flap 36 from the operative position and for actually causing the flap to leave the operative position as soon as the aforediscussed pressure differential is changed to a predetermined extent, namely when the difference between the pressure in the receptacle 48 and the pressure in the vessel 30 does not suffice to hold the flap 36 in the illustrated position. The exact timing of opening the flap 36 can be regulated by changing the inclination of the vessel 30 and/or by changing the bias which is applied to the flap in a direction to pivot it away from the operative position. The diameter of the illustrated flap 36 exceeds the diameter of the vessel 30.

The intermediate portion of the conduit 22 which is shown in FIG. 2 comprises a branch 43 which contains a normally closed shutoff valve 42 and is connected to the suction intake of a blower 41 or any other suitable source of compressed air. The valve 42 constitutes a means for admitting compressed air into the conduit 22 for the purpose of expelling any dust and/or other solid material which settles in the conduit while the respective dust separator is in use. A normally open shutoff valve 40 in the intermediate portion of the conduit 22 between the branch 43 and the open end 22.2 is closed prior to opening of the valve 42 so that compressed air which is supplied by the source 41 cannot penetrate into the vessel 30.

A portion of each conduit 22 extends above the level 24 in order to prevent penetration of flowable solid material into the conduit when the flowable material reaches the level 24. Moreover, this prevents dust which descends into the hoppers 12 from immediately penetrating into the vessels 30.

The operation of the monitoring apparatus which includes the conduit 22 of FIG. 2 is as follows:

The pressure in the hoppers 12 is normally below atmospheric pressure due to the provision of the fan or fans 11 serving to draw flue gases and/or other gaseous fluids from the hoppers. The stack or stacks which receive flue gases from the dust precipitators also constitute a means for drawing air from the hoppers 12. The illustrated fan 11 can be used to induce draft in the boiler of the power plant 10. The hoppers 12 normally communicate with the respective vessels 30 by way of the first openings 22.1 in the corresponding conduits 22, i.e., the pressure in the vessel 30 of FIG. 2 is normally below atmospheric pressure and the flap 36 is held in the operative position by suction. If the pressure in the hopper 12 is below atmospheric, simple pivoting of the flap 36 to the operative position will suffice to maintain the flap in such position as long as the pile of flowable solid material in the hopper 12 does not rise to the predetermined level 24. When such level is reached, the pressure in the conduit 22 begins to rise and the counterweight 34 ultimately pivots the flap 36 away from the operative position. This induces the supporting arm 32 to actuate a switch 35 forming part of a device for the generation of visible, audible and/or otherwise detectable signals. Such signals can be used to open the respective valve 13 so as to allow the accumulated flowable material to leave by way of the discharge opening 12.3 and to be transported away by the conveyor 14 of the disposal system. Signals which are generated by the switch 35 can be displayed for convenience of the attendants. The switch 35 can constitute a mercury switch, a microswitch or any other suitable signal generating device which, as stated above, can be used to set off an alarm and/or to open the corresponding valve 13.

As mentioned above, the monitoring station 26 may but need not always be accessible at the ground level 20. For example, if the power plant 10 already comprises one or more platforms at a level other than the ground level 20, and if it serves the convenience of the attendants or if it reduces the likelihood of access to unauthorized persons, the monitoring station 26 can be provided at the level of such existing platform, e.g., at the level 24 or at any level above or below the level 24. The level 24 in each of the hoppers 12 may but need not be the same. The arrangement may be such that the monitoring station 26 can be provided at the level of a platform or gallery which is already erected to afford access to the discharge openings 12.3 and to the valves 13.

The improved apparatus is susceptible of many additional modifications. For example, it is equally within the purview of the invention to equip a single container, such as the hopper of an electrostatic dust precipitator, with two or more apparatus which monitor the accumulations of dust or other flowable solid material at two or more different levels. The container is then equipped with two or more conduits whose first openings are disposed at different levels within the container and each of which comprises an intermediate portion extending, at least in part, to a level above the level of the respective first opening. The second openings of the conduits are located outside of the corresponding container and preferably at the same level, e.g., close to the ground.

The source 41 can contain a compressed gas other than air, and the receptacle 48 can be replaced with several discrete receptacles, one for each of the hoppers 12.

A system of dust precipitators whose hoppers can be equipped with the improved monitoring apparatus is disclosed, for example, in commonly owned U.S. Pat. No. 4,522,634 granted June 11, 1985 to Werner Frank for "Method and apparatus for automatic regulation of the operation of an electrostatic filter".

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for monitoring the accumulations of flowable solid material in a container for flowable material, particularly in the hopper of a dust separator, comprising a conduit having a first opening disposed in the container at a predetermined level, a readily accessible second opening outside of the container, and an intermediate portion disposed between said openings; means for establishing a pressure differential between the interior of the container and the atmosphere at the second opening so that a gaseous fluid tends to flow from one of said openings toward the other of said openings and the pressure differential undergoes a change in response to at least partial obstruction of said first opening as a result of accumulation of flowable material in the container to said level, said means for establishing said pressure differential comprising means for drawing gaseous fluid from the container so that the fluid tends to flow from said second opening toward said first opening; and means for generating signals in response to a rise of fluid pressure in said conduit, comprising a valving element movable to and from an operative position in which said valving element at least partially seals said second opening under the pressure of atmospheric air, and means for biasing said valving element away from said operative position so that the valving element is free to leave said operative position when the pressure differential between the interior of said conduit and the atmosphere at said second opening is reduced as a result of at least partial obstruction of said first opening by the flowable material in the container.

2. The apparatus of claim 1, wherein said predetermined level is above the ground level and said second opening is accessible at the ground level.

3. The apparatus of claim 1, wherein said signal generating means further comprises means for transmitting a detectable signal in response to movement of said valving element from said operative position.

4. The apparatus of claim 1, wherein said valving element comprises a flap which is pivotable to and from said operative position.

5. The apparatus of claim 1, wherein said biasing means comprises a weight.

6. The apparatus of claim 1, wherein said conduit further comprises a tubular vessel which defines said second opening and has a closed first end and an open second end, said valving element being arranged to close the second end of said vessel in the operative position thereof.

7. The apparatus of claim 1 for simultaneously monitoring the accumulations of flowable solid material in at least one additional container for flowable material, further comprising an additional conduit having a first opening disposed in the additional container at a preselected level, a readily accessible second opening outside of the additional container, and an intermediate portion disposed between the first and second openings of said additional conduit and extending at least in part above said preselected level, means for establishing a pressure differential between the interior of the additional container and the atmosphere at the second opening of said additional conduit so that a gaseous fluid tends to flow from one opening toward the other opening of said additional conduit and the pressure differential undergoes a change in response to at least partial obstruction of the first opening of said additional conduit as a result of an accumulation of flowable material in the additional container to said preselected level, and means for generating signals in response to a predetermined change of the pressure differential between the interior of the additional container and the atmosphere at the second opening of said additional conduit.

8. The apparatus of claim 7, wherein said preselected level matches or approximates said predetermined level.

9. The appararus of claim 7, wherein the second openings of said conduits and said signal generating means are adjacent to each other.

10. The apparatus of claim 1, further comprising means for expelling flowable material from said conduit.

11. The apparatus of claim 10, wherein said expelling means comprises a source of compressed gaseous fluid and means for selectively admitting compressed fluid from said source into said conduit.

12. The apparatus of claim 11, wherein said intermediate portion of said conduit comprises a branch connected with said source and said admitting means comprises a shutoff valve in said branch.

13. The apparatus of claim 12, further comprising a second shutoff valve provided in said intermediate portion between said branch and said second opening.

* * * * *